(12) United States Patent
Bitter

(10) Patent No.: US 7,726,665 B2
(45) Date of Patent: Jun. 1, 2010

(54) SUSPENSION SYSTEM

(75) Inventor: Marcus Bitter, Mannheim (DE)

(73) Assignee: Deere & Company, Moline, IL (US)

( * ) Notice: Subject to any disclaimer, the term of this patent is extended or adjusted under 35 U.S.C. 154(b) by 306 days.

(21) Appl. No.: 11/924,983

(22) Filed: Oct. 26, 2007

(65) Prior Publication Data
US 2008/0100017 A1 May 1, 2008

(30) Foreign Application Priority Data
Oct. 31, 2006 (DE) .................. 10 2006 051 894

(51) Int. Cl.
*B60G 17/04* (2006.01)

(52) U.S. Cl. .............. 280/5.502; 280/5.506; 280/5.507; 280/6.154; 280/6.159; 280/124.161; 280/755; 180/41

(58) Field of Classification Search .............. 280/5.501, 280/5.502, 5.504, 5.506–5.508, 5.513, 6.154, 280/6.157, 6.159, 124.16, 124.161, 755; 180/41
See application file for complete search history.

(56) References Cited

U.S. PATENT DOCUMENTS

| | | | | | |
|---|---|---|---|---|---|
| 5,342,023 | A | * | 8/1994 | Kuriki et al. | 267/64.17 |
| 5,682,980 | A | * | 11/1997 | Reybrouck | 280/5.504 |
| 5,899,472 | A | * | 5/1999 | Burke et al. | 280/124.106 |
| 6,131,918 | A | * | 10/2000 | Chino | 280/6.154 |
| 6,249,728 | B1 | * | 6/2001 | Streiter | 701/37 |
| 6,250,658 | B1 | * | 6/2001 | Sakai | 280/124.106 |
| 6,394,238 | B1 | * | 5/2002 | Rogala | 188/266.2 |
| 6,834,736 | B2 | * | 12/2004 | Kramer et al. | 180/89.12 |
| 7,055,831 | B2 | * | 6/2006 | Brandenburger | 280/5.504 |
| 7,104,548 | B2 | * | 9/2006 | Ichimura et al. | 280/6.154 |
| 7,240,906 | B2 | * | 7/2007 | Klees | 280/5.502 |

(Continued)

FOREIGN PATENT DOCUMENTS

EP 0 692 183 1/1996

(Continued)

OTHER PUBLICATIONS

European Search Report, 6 Pages, Feb. 19, 2008.

(Continued)

*Primary Examiner*—Paul N Dickson
*Assistant Examiner*—James English

(57) ABSTRACT

A suspension system for an agricultural or construction industry vehicle is described. The suspension system comprises two hydraulic cylinders, which support a frame in relation to an axle of the vehicle, the hydraulic cylinders each having a piston-side chamber and a piston rod-side chamber and each of the chambers of the hydraulic cylinders being connectable to one another via connecting lines provided with a switch valve, a first supply line, which can be connected via a switch valve to the piston-side connecting line of the first hydraulic cylinder, a second supply line, which can be connected via a switch valve to the piston-side connecting line of the second hydraulic cylinder, a hydraulic accumulator, in each case connectable to the supply lines via proportionally adjustable orifices, a hydraulic source, a hydraulic tank, a control valve device, and an electronic control unit. In order to prevent the activation of a suspension state in critical vehicle states, means for the detection and compensation of load states of the vehicle are provided in the suspension system.

16 Claims, 7 Drawing Sheets

U.S. PATENT DOCUMENTS

| | | | |
|---|---|---|---|
| 7,416,189 B2 * | 8/2008 | Wilde et al. | 280/5.504 |
| 7,543,824 B2 * | 6/2009 | Chapman | 280/5.514 |
| 2003/0047899 A1 * | 3/2003 | Gibbs | 280/124.157 |

FOREIGN PATENT DOCUMENTS

| | | |
|---|---|---|
| EP | 1 123 894 | 8/2001 |
| FR | 2 681 563 | 3/1993 |

OTHER PUBLICATIONS

JP 2000138999, Patent Abstracts of Japan, 1Page, Sep. 5, 2000.
JP2000238999, Patent Abstracts of Japan, 1 Page, Feb. 17, 1999.

* cited by examiner

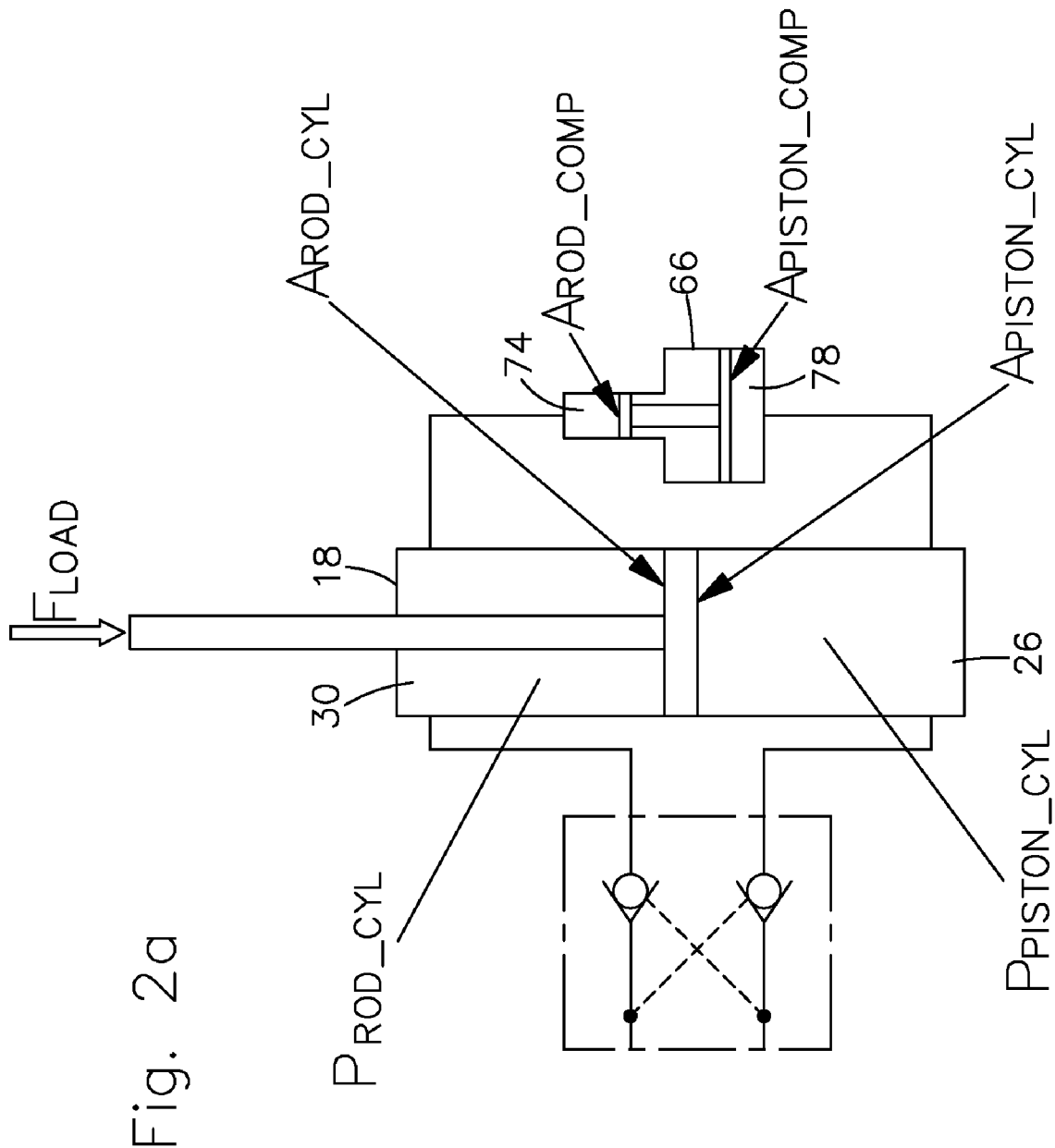

SUSPENSION SYSTEM

FIELD OF THE INVENTION

The invention relates to a suspension system for an agricultural or construction industry vehicle, in particular a loader vehicle, having a first and a second hydraulic cylinder, which support a frame of the vehicle in relation to an axle of the vehicle, the hydraulic cylinders each having a piston-side chamber and a piston rod-side chamber and each of the chambers of the hydraulic cylinders being hydraulically connectable to one another via a piston rod-side connecting line and a piston-side connecting line, the piston rod-side connecting lines each opening into the piston-side connecting lines and being provided with a switch valve, a first supply line, which can be connected via a switch valve to the piston-side connecting line of the first hydraulic cylinder, a second supply line, which can be connected via a switch valve to the piston-side connecting line of the second hydraulic cylinder, a first and a second hydraulic accumulator which can be connected to the first and second supply line respectively, a hydraulic source, a hydraulic tank, a control valve device, the control valve device being connected via the respective supply lines to the respective connecting lines, and an electronic control unit.

BACKGROUND OF THE INVENTION

Suspension systems in which the front axle is hydro-pneumatically sprung are known in agricultural vehicles, such as tractors, for example. Front axle suspension affords the driver greater ride comfort and increased working efficiency, since both the speed of travel and the traction of the vehicles can be significantly increased compared to unsprung vehicles. The hydraulic design configuration of such a front axle suspension generally comprises hydraulic accumulators, which are connected to hydraulic cylinders arranged on the front axle, which in turn connect a vehicle frame to the front axle. In such vehicles the front axle is embodied as a fully floating axle, so as to provide a sprung suspension. Such vehicles furthermore have a rigid rear axle, in order to counter the risk of rolling movements or even overturning of the vehicle. The use of a floating rear axle is therefore not possible with such suspension systems for only sprung front axles.

Agricultural vehicles are also known, which have both a sprung floating front axle and sprung wheel suspensions. Such vehicles are known, for example, in the form of John Deere, 8000-series tractors. In these the problem of rolling movements or a lateral tipping of the frame of the vehicle is resolved in that a hydraulic interconnection is made between the rod side of the suspension cylinders of one side of the rear axle and the piston side of the opposing suspension cylinder. The advantage of this interconnection is that a mechanical roll stabilizer can be dispensed with, since when one suspension cylinder is compressed, the opposing suspension cylinder is bound to be likewise retracted due to the increasing pressure on its rod side. In this way, rolling movements can to a certain extent be suppressed. An uneven loading of the vehicle, which would lead to tipping of the frame, can be compensated for by different pressures of the hydraulic accumulators contained in the suspension system. Such a suspension system, however, cannot be used on vehicles that do not have hydraulic cylinders on a floating rear axle.

In the case of loader vehicles, the front axle is generally designed as a rigid axle and the rear axle is floating. The reason for this is that the payload of a loader vehicle is primarily situated in front of the front axle, for which reason a greater stiffness is required in this area, in order to prevent the vehicle overturning. A suspension system for such a loader vehicle is also known and is used, for example, on the Turbofarmer 'P41.7 Top' produced by Merlo and marketed under the name 'EAS'—Electronic Active Suspension. The suspension system produced by Merlo comprises a front axle suspended on two hydraulic cylinders, the hydraulic cylinders being connected to hydraulic accumulators and the hydraulic cylinders and hydraulic accumulators being correspondingly controlled by an electronic control unit according to the attitude of and forces acting on the vehicle. The rear axle is in this case floating, affording both a suspension function for the front axle and a correction of the tilting of the vehicle frame. A roll stabilization implemented in the electronic control unit is intended to ensure that the vehicle always remains in a horizontal position. The roll stabilization, however, functions relatively sluggishly and requires improvement, since the ride comfort for an operator is less than ideal. A further disadvantage is that the suspension system can be activated irrespective of the load state of the vehicle and that critical vehicle states with regard to the positional stability can thereby occur, if the suspension is activated in correspondingly unfavorable load states or in an inclined position of the vehicle, which ultimately poses a safety risk. Furthermore, with the suspension activated, adjustments of the suspension system to varying load states are feasible only when the vehicle is at a standstill, so that an operator is obliged to interrupt his working process in order to obtain an optimum suspension effect, when load states change.

SUMMARY OF THE INVENTION

The object of the invention is to specify a suspension system of the aforementioned type, which will serve to overcome one or more of the aforementioned problems.

According to the invention a suspension system of the aforementioned type is designed in such a way that the hydraulic accumulators can be connected via adjustable orifices and means for the detection and compensation of load states on the suspension system are provided. The orifices are designed as proportionally adjustable orifices. The means for the detection and compensation of load states on the suspension system allow it to be determined, before the suspension is activated, whether the vehicle is in an unsafe load state. On activation of the suspension system and/or the suspension control system, the static states on the vehicle are fundamentally altered. Whereas with the suspension deactivated the vehicle is stable, on activation of the suspension the support width of the vehicle is reduced, with the result that forces may be introduced, which can cause the vehicle to overturn. Such forces may be caused, for example, by eccentric loading or inclined positions of the vehicle. The reduction in the support width occurs precisely at the moment at which the frame of the vehicle is resiliently supported on the hydraulic cylinders. Instead of the track width of the vehicle, which is available as support width when the suspension is deactivated, with the suspension activated only the distance between the attachment points of the hydraulic cylinders is available to hold a possible overturning moment. If an overturning moment were too great, a tensile force would occur on one of the hydraulic cylinders, which would pull the hydraulic cylinder completely apart, whilst the other hydraulic cylinder would be compressed and would serve as tipping point. Such a tipping movement would occur very rapidly on sudden activation of the suspension and in an extreme case would lead to overturning of the entire vehicle. The means for the detection and compensation of load states serve to avoid situations in which the suspension can be activated whilst critical load states prevail, since the state of the vehicle is analyzed, that is to say detected, before activation of the suspension, and if a critical load state prevails an activation of the suspension is not permitted. By purposely controlling the hydraulic cylinders, it is possible to compensate for critical load states, so that non-critical load states can be established on activation of the suspension.

The means for the detection and compensation of load states may comprise pressure transducers and means for registering the position of a pressure transducer, the pressure transducers in each case being arranged between the first and second chambers of each hydraulic cylinder. The pressure transducers constitute hydraulically compensatable load case detectors, situated on both hydraulic cylinders. The pressure transducers serve to detect whether a load is pulling on one of the two rods of the hydraulic cylinders. If this is the case, a pressure change will occur on the rod side of the hydraulic cylinder affected. Detecting this pressure change is not without problems, since a constrained pressure may be present in the hydraulic cylinder, which has resulted due to external heating or an adjustment of the hydraulic cylinder, for example. Pressure transducers are used in order to compensate for this constrained pressure.

In a preferred embodiment of the invention, pressure transducers are used, of which the area ratio of pressure-generating areas in the chambers is substantially equal to the area ratio of the pressure-generating areas in the chambers of the respective hydraulic cylinder. If this condition is fulfilled and no external force is acting on the hydraulic cylinder, a constrained pressure in the hydraulic cylinder will be compensated for, since the piston rod of the hydraulic cylinder and the pressure transducer piston will each move into a position of equilibrium of forces. If necessary, this may be supported on the pressure transducer by weak centring springs, in order to suppress any friction effects. At the instant when an external force acts on the piston rod of the hydraulic cylinder, the pressure equilibrium is upset and the piston of the pressure transducer changes its position. If a positive force acts on the piston rod of the hydraulic cylinder, the piston-side pressure of the hydraulic cylinder increases and the piston of the pressure transducer is forced upwards. At the same time a positive force means that some of the weight of the frame rests on this piston rod of the hydraulic cylinder. If a negative force acts on the piston rod, the rod-side pressure of the hydraulic cylinder increases and the piston of the pressure transducer is forced downwards. In this case a negative force means that the frame does not rest on the cylinder rod, but instead is pulling on it, which when the rod-side switch valve opens could lead to an extending of the piston rod of the hydraulic cylinder and hence to a tilting of the frame.

In a preferred embodiment of the invention, the means for registering the position of a pressure transducer comprise a switch or sensor. Since the direction of the force acting on the hydraulic cylinder can be determined from the position of the piston of a pressure transducer described above, such a pressure transducer is used and the position of the piston is determined by means of a switch or sensor. The precise form of the sensor or switch may vary greatly and will not be described in further detail here. For safety reasons, however, it is advisable for a switch to be designed as a normally open contact, so that any misinterpretation in the event of a cable break is excluded. It is important for the piston of the pressure transducer to be sealed leak-tight, so that no oil can flow from one side of the hydraulic cylinder to the other. It is important that the variable volume of the pressure transducer is not too great, so that uncontrollable movements of the frame cannot occur.

In another exemplary embodiment, the means for the detection and compensation of load states may comprise pressure sensors, capable of registering the pressure in the individual chambers of the first and second hydraulic cylinders. The function of the pressure sensors is to replace the functions of the pressure transducers described above by switches, the pressures prevailing in the hydraulic cylinder chambers being measured and evaluated with regard to the direction of the forces acting on the piston rod of the hydraulic cylinder. The compensation for any constrained pressure would therefore be electronically or computer-controlled.

The means for the detection and compensation of load states may further comprise pressure switches, each connected to a chamber of a hydraulic cylinder, the rod-side chamber, in a hydraulic cylinder arrangement in which the frame normally exerts a load on the piston side of the hydraulic cylinder, being connected to the pressure switch (an inverse arrangement of the hydraulic cylinders can obviously be used here and also in the examples already mentioned, the pressure switch then being connected to the rod-side chamber). Should a specific pressure, which can be generated only by a tensile force on the piston rod, now be exceeded on the rod side, the pressure switches close, or better still, open and the state is detected as being unsafe for the vehicle. It is naturally also feasible for pressure sensors to assume the functions of the pressure switches. Since constrained forces are not detected directly as such by the pressure switches, the load case sensing is not as precise as with pressure sensors or pressure transducers, for which reason an additional safety margin should be allowed here.

As a further example, the means for the detection and compensation of load states may comprise force sensors, which serve indirectly or directly to detect forces acting on the hydraulic cylinders. A direct measurement, here, for example, would measure the bearing forces of the articulation points of the suspension cylinders or the tensile forces acting on the cylinder rod. An indirect measurement can be performed by measuring the flexure or torsion of different areas of the axle or the frame, and inferring the load state of the vehicle from this.

The switch valves are preferably embodied in such a way that they have a flow position and a closed position, the closed position of the switch valves arranged in the supply lines comprising a non-return valve opening in the direction of the respective hydraulic cylinder and closing without any leakage in the other direction. The switch valves in the piston rod-side connecting lines, on the other hand, have a leak-tight closed position for both ducting directions. By switching the switch valve situated in the piston rod-side connecting line into the closed position, it is possible, irrespective of the control position of the switch valve situated in the supply line, to interrupt a hydraulic flow on both sides, that is to say both coming from the corresponding piston rod-side chamber, and flowing into this same corresponding chamber, whereas on the piston side only one corresponding hydraulic flow coming from the corresponding chamber can be interrupted, so that with the proportionally adjustable orifices on the hydraulic accumulator-side opened hydraulic fluid can flow out of the hydraulic accumulators into the corresponding piston-side chambers regardless of the control position of the switch valves in the supply lines. If a corresponding switch valve is in its open position, a hydraulic flow can ensue in both directions of the connecting line or supply line.

The connecting lines are preferably also provided with pressure switches. The pressure switches, in the event of a pressure drop due to a broken hose, for example, allow this to be detected and cause the switch valves to switch to their closed position, so that no hydraulic fluid can escape from the chambers of the hydraulic cylinder. Alternatively, these pressure switches can also be provided in the connecting lines to the hydraulic accumulator. In order to prevent the frame subsiding due to a broken hose or pipe, the switch valves assigned to a hydraulic cylinder must be fitted in such a way that there are no connecting elements in the form of hoses between these components. The hydraulic accumulator can be connected to the suspension system anywhere in the supply line between the switch valves on the respective piston side and the control valve device.

The control valve device preferably comprises a first admission line opening into the one supply line and a second admission line opening into the other supply line, and a first discharge line opening into the one supply line and a second discharge line opening into the other supply line, the admission lines being connectable via admission control valves to the hydraulic pump or the hydraulic tank, and the discharge lines being connectable via discharge control valves to the hydraulic tank. The admission into the chambers of the one hydraulic cylinder therefore occurs via the one admission control valve and the admission into the chambers of the other hydraulic cylinder occurs via the other admission control valve. The same likewise applies to the discharge via the discharge control valves.

The admission control valves and/or the discharge control valves preferably comprise switch valves, the admission control valves being embodied as 3/2-way valves and the discharge control valves as 2/2-way valves. A control position of each of the discharge control valves comprises a non-return valve closing in the direction of the hydraulic tank, the other control position preferably constituting a flow position in both ducting directions. The control valve device hitherto represented basically fulfils all necessary functions, the volumetric flows, if necessary, being furthermore electronically controllable by means of flow control valves.

In another embodiment the admission control valves and/or the discharge control valves may comprise proportional valves. Proportional valves allow the hydraulic cylinders to be controlled with adjustable volumetric flows independently of one another. This can be particularly advantageous during the loading operation, in order that the hydraulic cylinders can be extended more or less uniformly and simultaneously. It is also advantageous that the load state compensation already mentioned can be performed smoothly. This leads to improvements in the ride comfort and the driving safety. The main difference in the use of proportional valves compared to the ON/OFF-switch valves is that the two switch valves in the admission line are replaced by proportional valves and a proportional valve has been added in each of the two discharge lines. A leak-tight switch valve is still necessary in the discharge line in order to maintain the safeguard against broken hoses, since proportional valves may not be leak-tight. It is obviously feasible here, as also in the preceding embodiments, for the leak-tight switch valves to be replaced by resettable non-return valves, which are controlled by suitable means. It is only important that the connection can be sealed leak-tight and opened as necessary.

In order to make the supply to the suspension system vary as a function of the pressure, a load-sensing device is provided, which detects a pressure in the first or second admission line. The load-sensing device extends between the admission lines and a hydraulic oil supply, for example an adjustable hydraulic oil pump, the load-sensing device being provided with a shuttle valve, so that the highest pressure in the respective admission line is always signaled to the hydraulic oil supply. This load-sensing device may be used both in embodiments of the control valve device with switch valves and in that with proportional valves.

For pressure relief of the load-sensing device and to provide a safeguard against broken pipes or hoses, admission lines should be provided with a non-return valve opening in the direction of the supply lines.

The discharge lines are preferably provided with a restrictor or orifice. The restrictors or orifices ensure that the oil cannot flow too rapidly out of the chambers of the hydraulic cylinders, so that the process remains manageable. It would also be feasible to use suitable switch valves, or to use flow control valves upstream or downstream of the discharge control valves.

In a preferred embodiment of the invention the piston-side and the piston rod-side chambers of the hydraulic cylinders may each be provided with a resettable non-return valve, the non-return valve opening in the direction of the respective chamber. This serves not only for using the hydraulic cylinders as suspension cylinders but also, with the suspension deactivated, for using the hydraulic cylinders as a type of incline compensation, purposely allowing the frame in an inclined position to be hydraulically tilted to the side, in order to increase the stability and to compensate for an incline or a canted position.

The suspension system according to the invention may be used in particular on agricultural or construction industry vehicles, in particular loader vehicles, having a floating first axle and a sprung second axle, since the critical load states often occurring in the operation of such vehicles can be detected by the devices provided for load state sensing and corresponding measures taken to rectify such load states or to establish a non-critical load distribution on the vehicle, before the suspension of the vehicle is activated. Depending on the type of vehicle, the front axle or the rear axle of the vehicle may be sprung, and the rear axle or the front axle may be floating.

The suspension system according to the invention constitutes a suspension with hydraulic roll stabilization for the sprung axle of the vehicle. It is advantageous here that the sprung axle can be sprung without the need for additional mechanical measures for roll stabilization. The aforementioned suspension system has two hydraulic cylinders, which can be operated independently of one another and which resiliently support the frame of the vehicle in relation to the axles of the vehicle. In order to prevent rolling movements occurring whilst underway, the suspension system is provided with electrically and proportionally adjustable orifices, in each case arranged between hydraulic cylinder and hydraulic accumulator. The orifices ensure that the damping rate of the respective hydraulic cylinder is adjustable according to the movements of the frame relative to the axle. By varying the damping rate and an associated stiffening of the system, it is possible to hydraulically suppress rolling movements. For detection of the rolling movement, corresponding sensors or other means are provided, which serve to measure and evaluate the position and above all the variation in the position of the frame relative to the vehicle axles. A sprung axle considerably reduces the impacts on the overall structure of the vehicle and thus increases the life of load-bearing parts. Owing to the reduced vibrations, even smaller components are less stressed, so that their reliability is increased. The suspension system furthermore brings considerable improvements in ride comfort and increases the driving stability at high speeds. This may also afford time advantages in the operation of the vehicle. A further advantage is that the suspension system according to the invention manages with two hydraulic accumulators, provided that it is ensured that suspension movements cannot lead to a vacuum in the hydraulic accumulators, which except in piston accumulators would lead to damaging of the hydraulic accumulator.

BRIEF DESCRIPTION OF THE DRAWINGS

FIG. 2a is a schematic drawing of a hydraulic cylinder with pressure transducer showing a schematic and exemplary representation of the respective areas, pressures and forces;

DESCRIPTION OF THE PREFERRED EMBODIMENT

Figure 1:
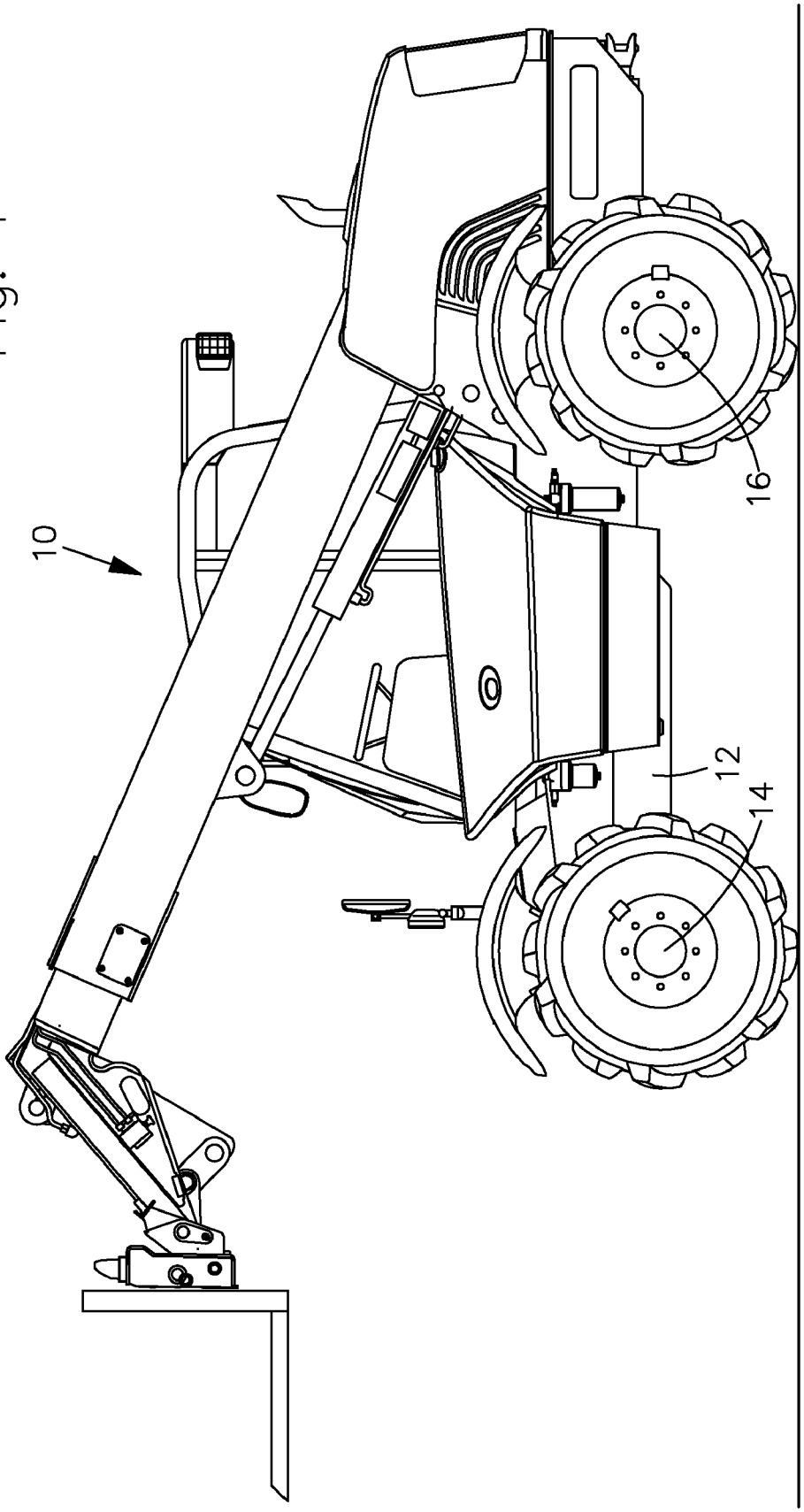
FIG. 1 is a side view of a telescopic loader having a suspension system according to the invention.

FIG. 1 shows an agricultural vehicle 10 in the form of a telescopic loader, which has a frame 12, a front axle 14 and a rear axle 16. The rear axle 16 is floating, as is usual for telescopic loaders. The front axle 14 is sprung in such a way that hydraulic cylinders 18, 20, which are part of a suspension system 22 with hydraulic roll stabilization, explained in more detail in FIGS. 2 to 6, extend between the frame 12 and the front axle 14, on either side of the vehicle central longitudinal axis. Similarly, the front axle 14 could also be floating and the hydraulic cylinders for suspension of the rear axle 16 could be correspondingly arranged between the rear axle 16 and the frame 12. It is also feasible to use such a suspension system 22 on a tractor (with or without front loader), a wheeled loader or another loader vehicle.

The suspension system 22 will be described in detail with reference to FIGS. 2 to 6, the system components for the load state sensing being represented only in FIGS. 2 to 4, and having been omitted for the sake of simplicity in FIG. 5. For the sake of simplicity, the detailed representation of a control valve device 24 or 24' has furthermore been dispensed with in FIGS. 2 to 4, and will be described in more detail with reference to FIGS. 5 and 6.

Figure 2:
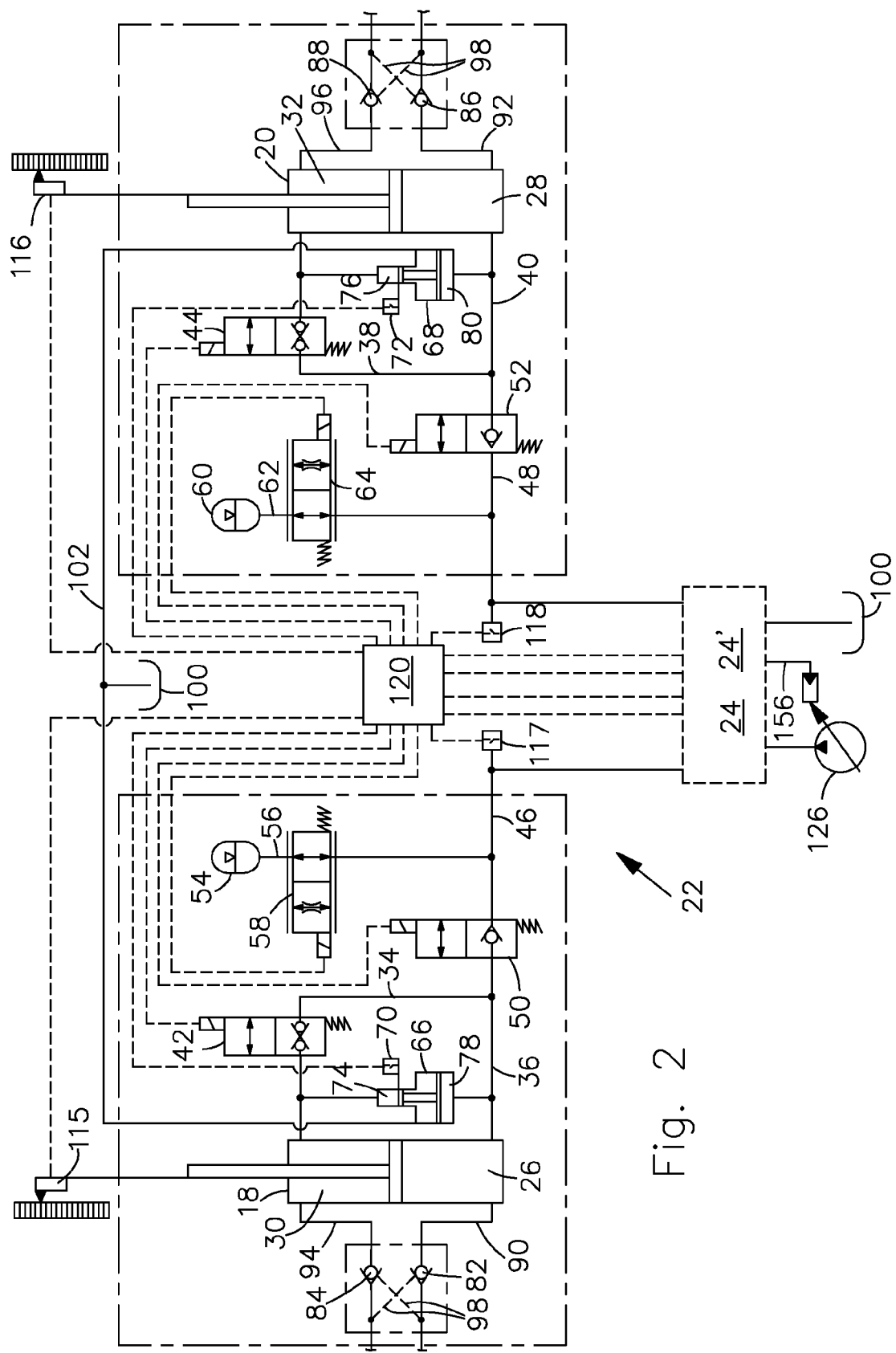
FIG. 2 is a schematic hydraulics circuit diagram (without control valve device) of an exemplary embodiment of a suspension system with hydraulic load state detection by means of pressure transducers.

In a first exemplary embodiment according to FIG. 2, the suspension system has a first hydraulic cylinder 18 and a second hydraulic cylinder 20. The hydraulic cylinders each have a piston-side chamber 26, 28 and a piston rod-side chamber 30, 32. The piston rod-side chamber 30 of the first hydraulic cylinder 18 is connected via a hydraulic connecting line 34 to a hydraulic connecting line 36 connected to the piston-side chamber 26 of the first hydraulic cylinder 18. The piston rod-side chamber 32 of the second hydraulic cylinder 20 is connected via a hydraulic connecting line 38 to a hydraulic connecting line 40 connected to the piston-side chamber 28 of the second hydraulic cylinder 20. A switch valve 42 is arranged in the piston rod-side connecting line 34 of the first hydraulic cylinder 18. A switch valve 44 is arranged in the piston rod-side connecting line 38 of the second hydraulic cylinders 20. The hydraulic connecting lines 34, 36 of the first hydraulic cylinder 18 are connected via a first supply line 46 to the control valve device 24, 24'. The hydraulic connecting lines 38, 40 of the second hydraulic cylinder 20 are connected via a second supply line 48 to the control valve device 24, 24'. The first and the second supply lines 46, 48 are each provided with a switch valve 50, 52. A first hydraulic accumulator 54, which is connected via a hydraulic connecting line 56 to the first supply line 46, is arranged between the control valve device 24, 24' and the switch valve 50 of the first supply line 46. The connecting line 56 is provided with an electrically and proportionally adjustable orifice 58. A second hydraulic accumulator 60, which is connected via a hydraulic connecting line 62 to the second supply line 48, is arranged between the control valve device 24, 24' and the switch valve 52 of the second supply line 48. The connecting line 62 is provided with an electrically and proportionally adjustable orifice 64. The switch valves 42, 44, 50, 52 each have a flow position, in which a hydraulic flow is permitted in both ducting directions, and a closed position, the closed position for the switch valves 42, 44 in the piston rod-side connecting lines 34, 38 being defined by a leak-tight bilateral closed position and the closed position for the two switch valves 50, 52 in the supply lines 46, 48 being defined by an integral non-return valve, which permits a hydraulic flow only in the direction of the respective hydraulic cylinder 18, 20, so that, from the supply lines 46, 48, a hydraulic flow in the direction of the hydraulic cylinders 18, 20 cannot be interrupted by the switch valves 50, 52, but the admission into the piston rod-side chambers 30, 32 can be interrupted by the switch valves 42, 44. The chambers 26, 28, 30, 32 of the hydraulic cylinders 18, 20 can be connected to the hydraulic accumulators 54, 60 or their connection can be interrupted, according to the control positions of the switch valves 42, 44, 50, 52, the electrically and proportionally adjustable orifices 58, 64 of the hydraulic accumulators 54, 60 being adjustable between an unrestricted open position and a fully restricted position.

In the exemplary embodiment represented in FIG. 2 a first pressure transducer 66 is arranged on the first hydraulic cylinder 18 between the chambers 26, 30. A second pressure transducer 68 is arranged on the second hydraulic cylinder 20 between the chambers 28, 32. The pressure transducers 66, 68 are each provided with a position switch 70, 72. Like the hydraulic cylinders 18, 20, the pressure transducers 66, 68 have a first chamber 74, 76 and a second chamber 78, 80, the first chamber 74, 76 in each case being hydraulically connected to the piston rod-side chamber 30, 32 of the hydraulic cylinders 18, 20 and the second chamber 78, 80 in each case being hydraulically connected to the piston-side chamber 26, 28 of the hydraulic cylinders 18, 20. The pressure transducers 66, 68 are here designed so that the area ratio of the pressure-transmitting areas in the chambers 74, 76 and 78, 80 corresponds to the area ratios of the pressure-transmitting areas in the chambers 30, 26 and 32, 28 of the hydraulic cylinders 18, 20.

The hydraulic cylinders 18 and 20 are furthermore provided with resettable non-return valves 82, 84 and 86, 88, which are capable of opening in the direction of the chambers 26, 30 and 28, 32 of the hydraulic cylinders 18 and 20. The piston-side non-return valves 82, 86 are arranged in the hydraulic lines 90, 92, which are connected to the piston-side chamber 26, 28 of the respective hydraulic cylinder 18, 20. The piston rod-side non-return valves 84, 88 are arranged in the hydraulic lines 94, 96, which are connected to the piston rod-side chamber 30, 32 of the respective hydraulic cylinder 18, 20. For resetting or opening each of the non-return valves 82, 84, 86, 88 a control pressure line 98 is provided, which for each hydraulic cylinder 18, 20 in each case connects the piston-side non-return valve 82, 86 to the piston rod-side hydraulic line 94, 96 and the piston rod-side non-return valve 84, 88 to the piston-side hydraulic line 90, 92. In this way the first and second hydraulic cylinders 18, 20 can be adjusted independently of the switch valves 42, 50 provided in the connecting line 34 and in the supply line 46 of the first hydraulic cylinder 18 and independently of the switch valves 44, 52 provided in the connecting line 38 and in the supply line 48 of the second hydraulic cylinder 20. Thus it is possible to compensate for an inclination or a canted position, for example, and/or to adjust the load state of the vehicle 10.

The pressure transducers 66, 68 with preferably integral position switches 70, 72 serve as load case detectors, which are correspondingly capable of detecting a load state or load case on the hydraulic cylinders 18, 20. The basic concept is to make it possible to detect whether a load is pulling on either of the two piston rods of the hydraulic cylinders 18, 20. Should this be the case, this would mean that there is a higher pressure on the piston rod side of the hydraulic cylinder 18, 20 affected than on its piston side. Such a pressure differential can occur due to the presence of a constrained pressure in the hydraulic cylinder 18, 20, which has resulted, for example, due to external heating or to an adjustment of the hydraulic cylinder 18, 20 via the two resettable non-return valves 82, 84 and 86, 88 in order to compensate for a canted position. In order to detect this constrained pressure, use is made of the pressure transducers 66, 68, the area ratios of which correspond to those of the hydraulic cylinders 18, 20. Should a critical load state or load case be detected, this must accordingly be compensated for before the hydraulic suspension is activated, which can be done by appropriately switching in the hydraulic accumulators 54, 60 via the respective switch valves 42, 44, 50, 52 and via the orifices 58, 64. To compensate for the critical load states, the hydraulic cylinders 18, 20 must be correspondingly controlled via the hydraulic lines 90, 94 and 92, 96 provided with the resettable non-return valves 82, 84 and 86, 88.

In FIG. 2a the equilibrium of forces and pressures occurring on the hydraulic cylinder 18 and on the pressure transducer 66 is explained in more detail with reference to the example of the first hydraulic cylinder 18 and the first pressure transducer 66. The statements regarding this will apply analogously to the second hydraulic cylinder 20 and the second pressure transducer 68.

The following equilibrium of forces results on the piston rod of the hydraulic cylinder 18, where $p_{ROD\_CYL}$ is the pressure in the piston rod-side chamber 30, $A_{ROD\_CYL}$ is the piston rod-side piston area, $F_{LOAD}$ is an external force acting on the piston rod, $p_{PISTON\_CYL}$ is the pressure in the piston-side chamber 26 and $A_{PISTON\_CYL}$ is the piston-side piston area:

$$p_{ROD\_CYL} * A_{ROD\_CYL} + F_{LOAD} = p_{PISTON\_CYL} * A_{PISTON\_CYL}.$$

The following equilibrium of forces is established on both areas $A_{ROD\_COMP}$ and $A_{PISTON\_COMP}$ of the pressure transducer 66:

$$p_{ROD\_CYL} * A_{ROD\_COMP} = p_{PISTON\_CYL} * A_{PISTON\_COMP}.$$

For the areas $A_{ROD\_CYL}$ and $A_{PISTON\_CYL}$ of the hydraulic cylinder 18 and $A_{ROD\_COMP}$ and $A_{PISTON\_COMP}$ of the pressure transducer 66, the following condition must be valid:

$$A_{ROD\_CYL}/A_{PISTON\_CYL} = A_{ROD\_COMP}/A_{PISTON\_COMP}$$

If this condition is fulfilled and no external force is acting on the hydraulic cylinder 18, a constrained pressure in the hydraulic cylinder 18 would be compensated for, since the piston rod of the hydraulic cylinder 18 and the piston rod of the pressure transducer 66 would each move into a position in which an equilibrium of forces prevailed. On the pressure transducer 66 this may be assisted by means of centring springs, in order to suppress any friction effects. At the instant an external force acts on the piston rod of the hydraulic cylinder 18, the pressure equilibrium is disturbed and the piston of the pressure transducer 66 changes position. If a (positive) force pressing on the piston of the hydraulic cylinder 18 acts on the cylinder rod, the pressure $p_{PISTON\_CYL}$ increases and the piston of the pressure transducer 66 is forced upwards. At the same time, a positive force means that part of the weight of the frame 12 of the vehicle 10 rests on the piston rod. If a force pulling on the piston rod acts on the piston rod of the hydraulic cylinder 18, the pressure $p_{ROD\_CYL}$ increases and the piston of the pressure transducer 66 is pressed downwards. In this case a negative force means that the frame 12 of the vehicle 10 does not rest on the piston rod, but is instead pulling on it, which when the piston rod-side switch valve 42 (and 44) opens could lead to extending of the piston rod and thereby to tipping of the frame 12 and of the vehicle 10.

Since the direction of the force can be determined from the position of the piston of the pressure transducer 66, 68, this part of the exemplary embodiment is concerned with determining the position of the piston of the pressure transducer 66, 68 by means of a switch 70, 72 or sensor. The precise embodiment of the sensor or switch 70, 72 may vary widely and will not be described in further detail here. For safety reasons, however, it is advisable for a switch 70, 72 to be designed as a normally open contact. This ensures that a broken cable cannot lead to a misinterpretation. It is furthermore important that the piston of the pressure transducer 66, 68 is sealed leak-tight, so that no oil can flow from one chamber 26, 28 of the hydraulic cylinder 18, 20 to the other chamber 30, 32 of the hydraulic cylinder 18, 20. A leakage line 102 opening into a hydraulic tank 100 serves to compensate for the volume either generated or disappearing under the displacement of the piston of the pressure transducer 66, 68. It is important that the variable volume of the pressure transducer 66, 68 is not so great that it can result in uncontrollable movements of the frame 12.

The function of the pressure transducer 66, 68 and the switch can basically also be described as that of pressure differential switches, which are quite common in the low-pressure range and which can assume the same functions.

In the non-critical load state when the frame 12 is resting on both piston rods of the hydraulic cylinders 18, 20, the pistons of the pressure transducers 66, 68 are in an upper position, which can be detected by the switches 70, 72 fitted. In such a case the two piston rod-side switch valves 42, 44 of the hydraulic cylinders 18, 20 can safely be opened.

A critical load state or load case arises when the frame 12 rests, for example, on the piston rod of the second hydraulic cylinder 20 and is pulling on the piston rod of the first hydraulic cylinder 18. In such a case, the frame 12 would immediately tilt to the right if the piston rod-side switch valve 42 of the first hydraulic cylinder were opened. This critical load state will be detected, however, inasmuch as the pistons of the pressure transducers 66, 68 run into different positions, that is to say the piston of the pressure transducer 68 of the second hydraulic cylinder 20 runs into an upper position and the piston of the pressure transducer 66 of the first hydraulic cylinder 18 runs into a lower position. The switch 72 of the second pressure transducer 68 would therefore be closed and the switch 70 of the first pressure transducer 66 open. The critical load state is thereby clearly detectable and an activation of the suspension can be prevented by opening of the switch valves 42, 44, 50, 52.

The same applies to the reverse case, that is to say when the frame rests on the piston rod of the first hydraulic cylinder 18 and is pulling on the piston rod of the second hydraulic cylinder 20. In such a case the frame 12 would immediately tilt to the left, if the piston rod-side switch valve 44 of the second hydraulic cylinder were opened. As in the case above, this critical load state would here also be detectable, since instead of both switches 70, 72, only the one switch 70 of the first pressure transducer 66 is closed.

Figure 3:
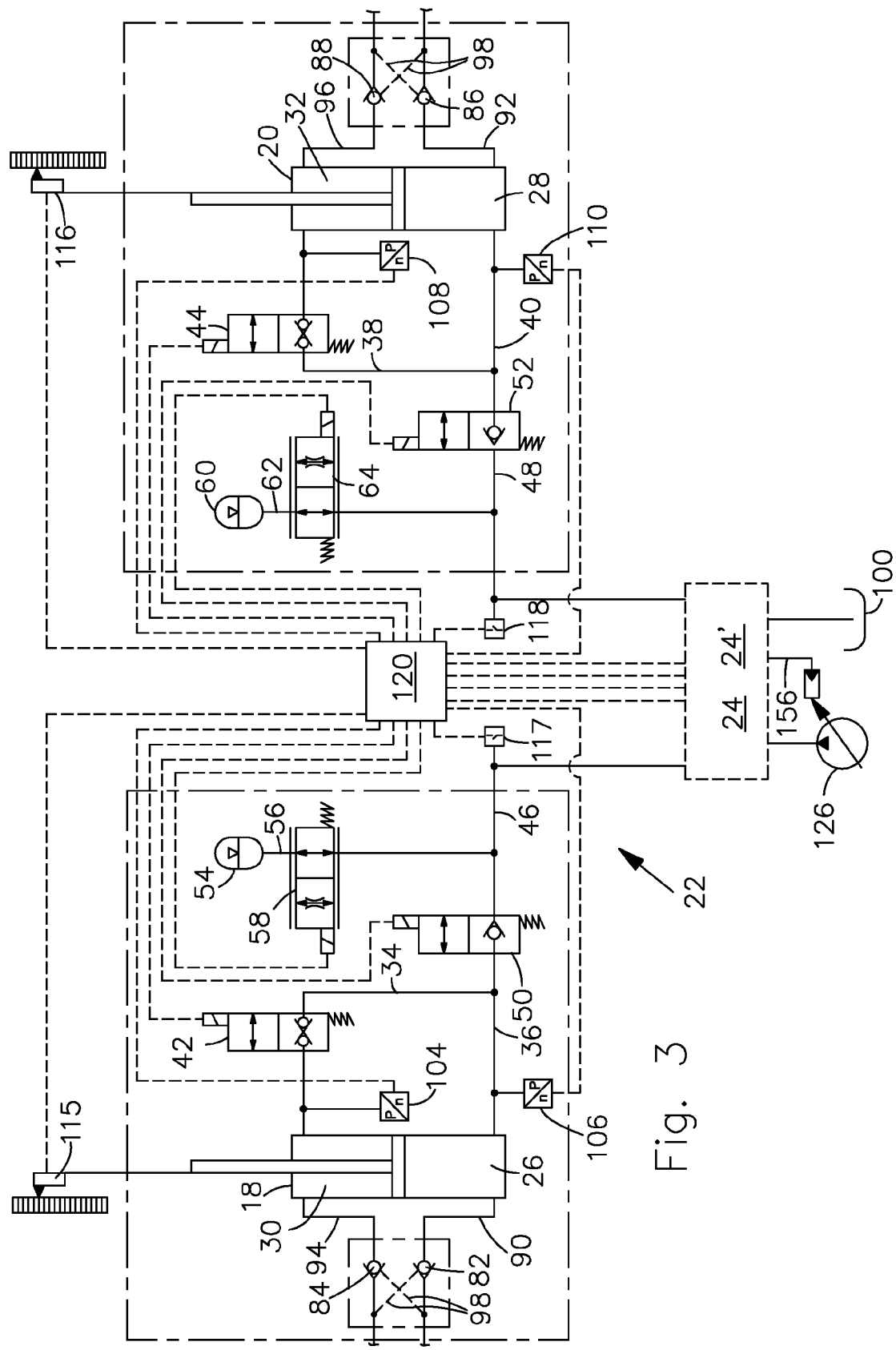
FIG. 3 is a schematic hydraulics circuit diagram (without control valve device) for a further exemplary embodiment of a suspension system with hydraulic load state detection by means of pressure sensors.

In a further exemplary embodiment, as shown in FIG. 3, the load state detection is achieved by means of four pressure sensors 104, 106, 108, 110, which are provided instead of the pressure transducers 66, 68, the pressure sensors 104, 106, 108, 110 registering the pressures prevailing in the chambers 30, 26, 32, 28 of the hydraulic cylinders 18, 20. A corresponding evaluation of the measured pressures provides an indication of the forces acting on the piston rods of the hydraulic cylinder 18, 20, so that tensile and compressive forces can be detected as a function of the load.

Figure 4:
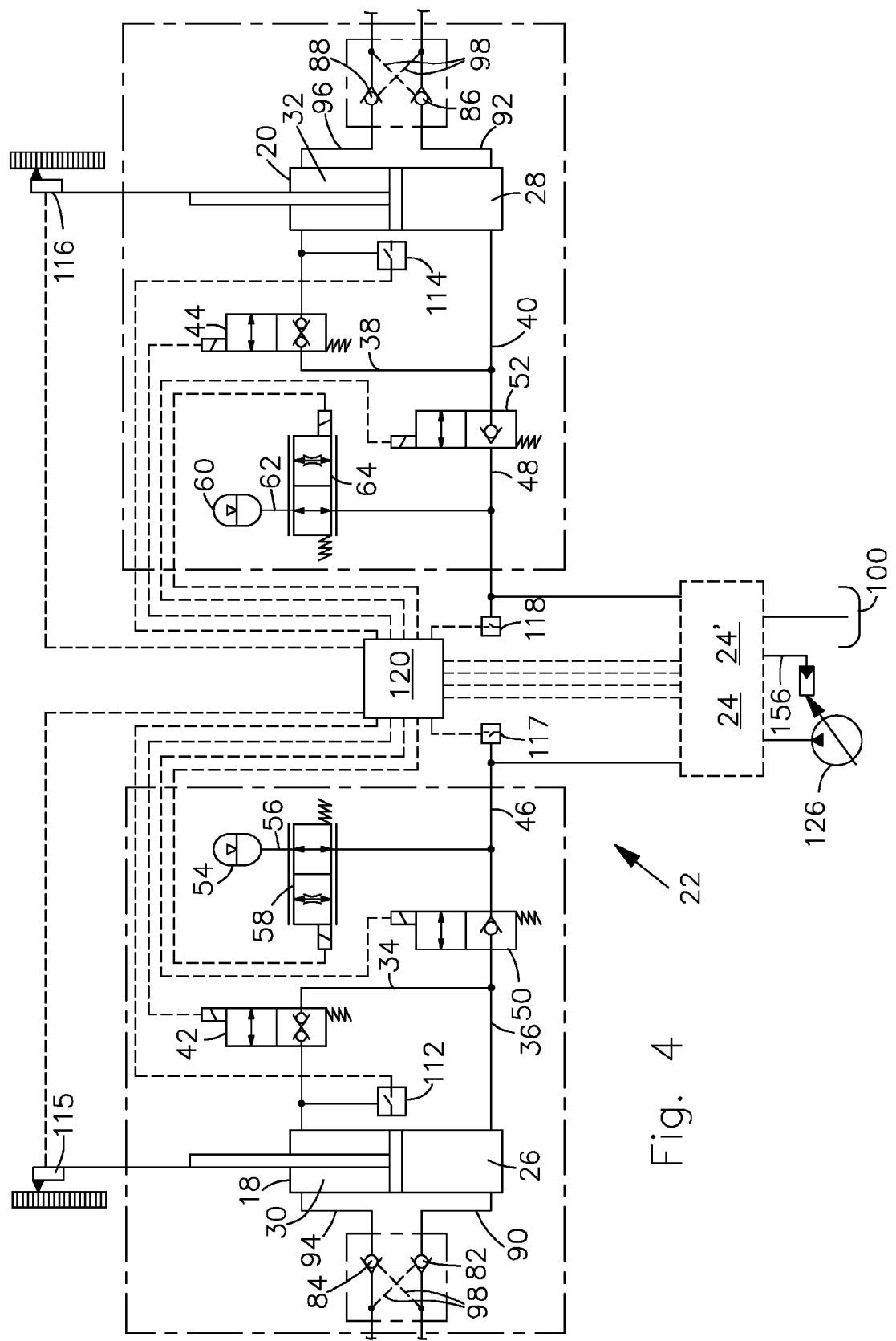
FIG. 4 is a schematic hydraulics circuit diagram (without control valve device) of a further exemplary embodiment of a suspension system with hydraulic load state detection by means of pressure switches.

A further exemplary embodiment is shown in FIG. 4, in which a first pressure switch 112 is arranged between the piston rod-side chamber 30 of the first hydraulic cylinder 18 and the switch valve 42, and a second pressure switch 114 is arranged between the piston rod-side chamber 32 of the second hydraulic cylinder 20 and the switch valve 44. Should a specific pressure, which can be generated only by a force pulling on the piston rod, here be exceeded in one of the piston rod-side chambers 30, 32, the pressure switches 112, 114 close, or better still open, and the state is detected as unsafe for the vehicle 10. It is obviously feasible for pressure sensors to assume the functions of the pressure switches 112, 114. Since constrained forces can be taken into account and detected as such only to a limited extent, an additional safety margin should be allowed in a corresponding activation criterion for the suspension.

In another exemplary embodiment the forces acting on the piston rods can also be directly or indirectly measured, registered and evaluated by means of force sensors (not shown) and the load states acting on the hydraulic cylinder 18, 20 and on the vehicle 10 thus detected. A direct measurement here would measure the bearing forces on the articulation points of the hydraulic cylinders 18, 20, for example, or might represent the tensile forces acting on the piston rods. An indirect measurement can be made by measuring the flexure or torsion of various areas of the axle 14, 16 or of the frame 12, and inferring the load state of the vehicle 10 from this.

The exemplary embodiments described above comprise a suspension system 22 with hydraulic roll stabilization and means for load state detection, both hydraulic cylinders 18, 20 being safeguarded by leak-tight switch valves 42, 50 and 44, 52 in such a way that they cannot move if the suspension is not activated and the switch valves 42, 44, 50, 52 are closed. The hydraulic cylinders 18, 20 are each provided with a position sensor 115, 116, so that the travel of the hydraulic cylinders 18, 20 with the suspension activated is monitored and controlled directly or indirectly and a roll stabilization can be achieved though corresponding opening and closing of the electrically and proportionally adjustable orifices 58, 64, in such a way that the suspension system and the retraction and extension into the hydraulic accumulators 54, 60 can be correspondingly stiffened. Since both hydraulic cylinders 18, 20 are moveably arranged, corresponding moving parts of the connecting and supply lines 34, 46 and 38, 48 are embodied as hoses. In order to prevent the frame 12 subsiding in the event of a fractured pipe, both the leak-tight switch valves 42, 44, 50, 52 and the respective resettable non-return valves 82, 84, 86, 88 must be fitted in such a way that no hoses are provided as connecting elements between these components. The hydraulic accumulators 54, 60 can each be arranged anywhere between the switch valves 50, 52 and the control valve device 24, 24' in their corresponding supply lines 46, 48.

The supply lines 46, 48 are each monitored by a pressure switch 117, 118 and serve as an electronic pipe fracture safeguard, which ensures that a pressure drop in the event of a fractured pipe is immediately detected by an electronic control unit 120 implemented in the suspension system 22 and corresponding control measures are taken, and that corresponding control commands for the switch valves 42, 44, 50, 52 are generated by the electronic control unit 120, in order to hold the frame 12 of the vehicle 10 in its position. The pressure switches 117, 118 may here be embodied as pressure sensors.

A detailed description of the electronic control unit 120 will be dispensed with here, since the use of electronic control units 120 in hydraulic suspension systems 22 and the generation of corresponding control commands by electronic control units 120 is part of the prior art and can easily be translated by an average person skilled in the art active in the sphere of electro-hydraulic control technology. It is naturally to be assumed here that all switch valves relevant to the circuit can be controlled via control signals generated by the electronic control unit. Furthermore, it is naturally assumed that the electronic control unit 120 receives corresponding signals and uses these to generate control signals, signals for generating control signals for the respective exemplary embodiment described being supplied by the sensors and switches (70, 72, 104, 106, 108, 110, 112, 114, 115, 116, 117, 118) represented in FIGS. 2 to 5 and of electronic and/or electro-hydraulic relevance to the circuit.

The basic hydraulics circuit diagram for a front axle suspension with hydraulic roll stabilization has already been described above with reference to FIGS. 2 to 4, it now being proposed to examine the exemplary embodiments for the control valve device 24, serving for the hydraulic supply to the suspension system 22, in more detail below with reference to FIGS. 5 and 6.

Figure 5:
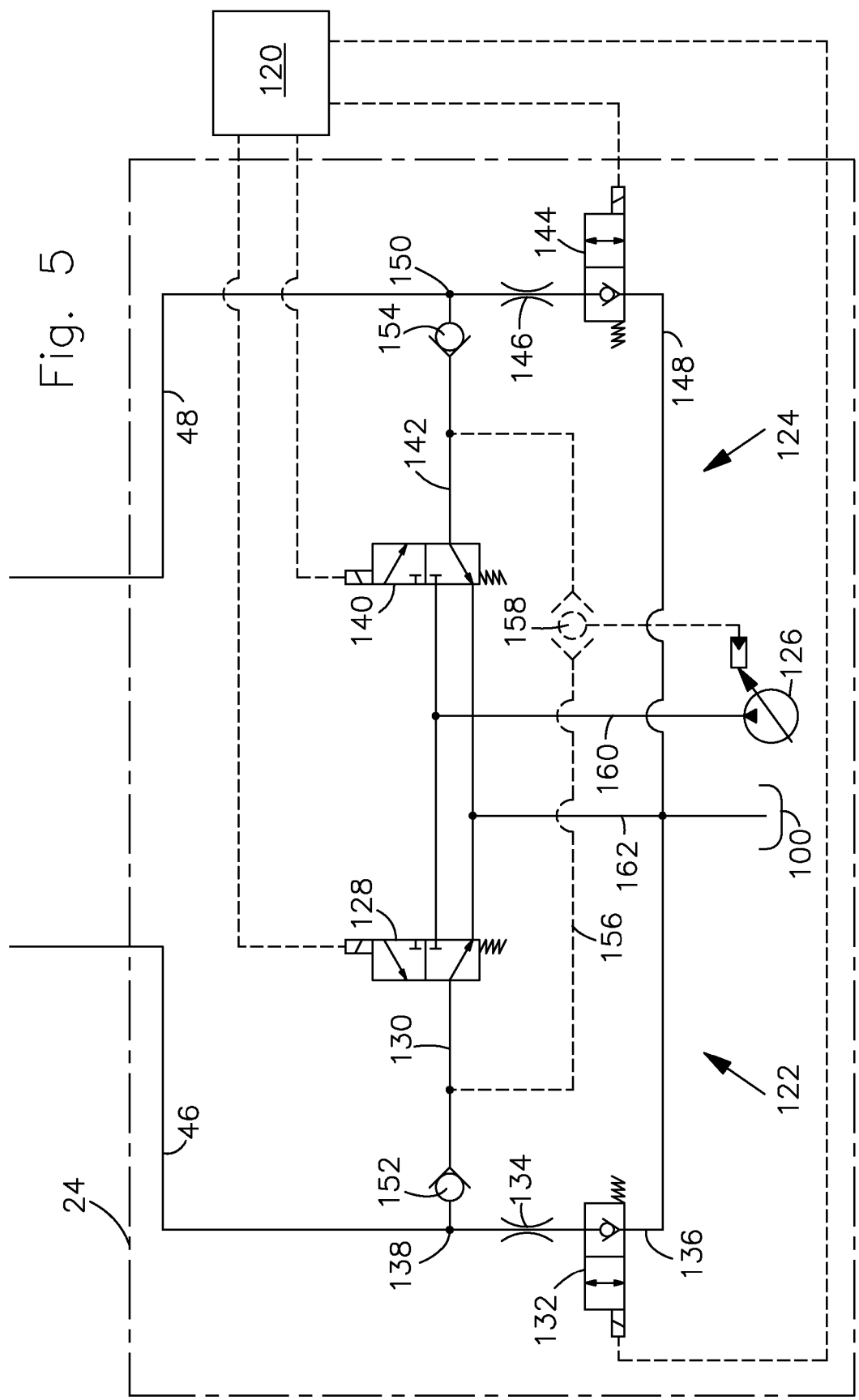
FIG. 5 is a simplified schematic hydraulics circuit diagram (without load case detection) according to the exemplary embodiments represented in FIGS. 2 to 4, but showing the control valve device; and, FIG. 6 is a simplified schematic hydraulics circuit diagram (without load case detection) according to FIG. 5, with an alternative embodiment of the control valve device.

FIG. 5 shows the hydraulics circuit diagram of the suspension system 22 used for the preceding exemplary embodiments in connection with an exemplary embodiment of the control valve device 24 (a repeated representation of the components used for load state detection being omitted here). The control valve device 24 has a first and a second control chain 122, 124, the control chains 122, 124 being aligned parallel with one another and supplied by a common hydraulic pump 126. The first control chain 122 has a first admission line 130 provided with a first admission control valve 128 and a first discharge line 136 provided with a first discharge control valve 132 and a restrictor or orifice 134, the first admission line 130 and the first discharge line 136 being connected to the first supply line 46 at a junction 138. The second control chain 124 has a second admission line 142 provided with a second admission control valve 140 and a second discharge line 148 provided with a second discharge control valve 144 and a restrictor or orifice 146, the second admission line 142 and the second discharge line 148 being connected to the second supply line 48 at a junction 150. The discharge lines 136, 148 each open into the hydraulic tank 100. The first admission line 130 is provided with a first non-return valve 152 closing in the direction of the first admission control valve 128 and the second admission line 142 with a second non-return valve 154 closing in the direction of the second admission control valve 140. A load-sensing device 156 (load and pressure sensing device) is also provided, which, branching off via a shuttle valve 158, signals the highest hydraulic pressure prevailing in the admission lines 130, 142 at any given time to the hydraulic pump 126, so that the hydraulic pump 126 embodied as a variable adjusting pump system receives a corresponding pressure signal. A pump line 160 and a tank line 162 connect the two admission control valves 128, 140 to the hydraulic pump 126 and to the tank 100. The non-return valves 152, 154 are arranged between the corresponding junctions 138, 150 and the admission control valves 128, 140, the load-sensing device 156 picking up the pressure in the admission lines 130, 142 between the non-return valves 152, 154 and the admission control valves 128, 140. The admission control valves 128, 140 are embodied as 3/2-way switch valves, so that in an admission position hydraulic fluid is delivered to the suspension system 22, and in a relief position the hydraulic fluid present in the admission line 130, 142 can flow off into the hydraulic tank 100. The load-sensing device 156 is thereby relieved and the pressure that has built up in the load-sensing device is simultaneously reduced. The discharge control valves 132, 144 are embodied as 2/2-way switch valves and each have a flow position in both ducting directions and a leak-tight closed position closing in the direction of the hydraulic tank 100. To boost the pressure of a control chain 122, 124, the corresponding admission control valve 128, 140 is switched into a position in which it is open in the direction of the hydraulic pump 126 and closed to the hydraulic tank 100 and the corresponding discharge control valves 132, 144 are brought into their corresponding closed position. For reducing the pressure, the corresponding admission control valve 128, 140 is brought into a position in which it is closed in the direction of the hydraulic pump 126 and opened to the hydraulic tank 100 and the discharge control valve 132, 144 is simultaneously brought into the flow position. The control sequence for boosting pressure and for reducing pressure can be performed singly for only one control chain 122, 124, and for both control chains 122, 124 together, according to control requirements. Pressure can furthermore be boosted in one control chain 122, 124, whilst a pressure reduction is taking place in the other control chain 122, 124.

The control valve device 24 described above basically fulfils all requisite functions, it being possible, where necessary, to make the volumetric flows electronically controllable by means of flow control valves (not shown).

Figure 6:
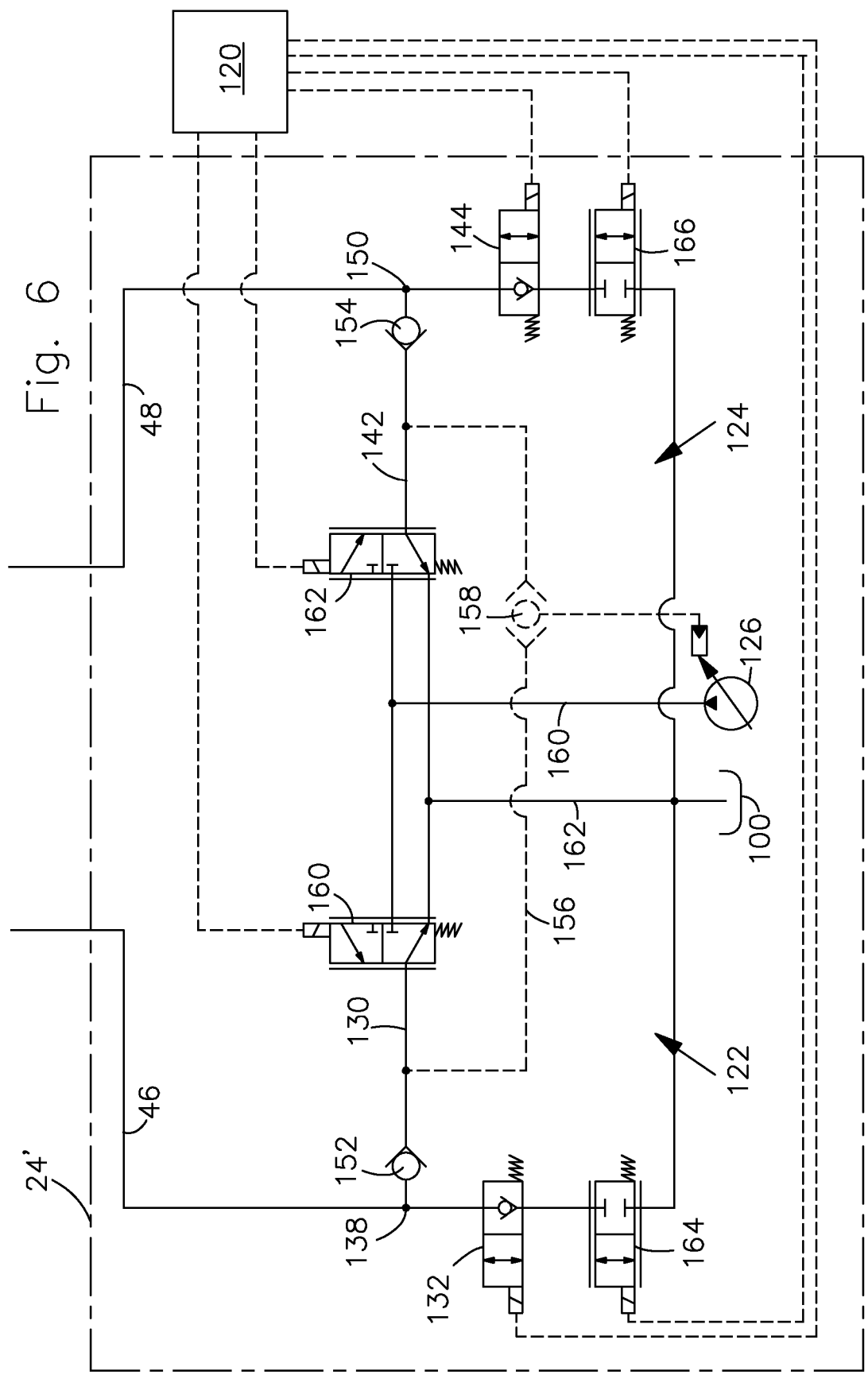

A further exemplary embodiment of a control valve device 24' is represented in FIG. 6. Here the hydraulic cylinders 18, 20 can be controlled with volumetric flows adjustable independently of one another. This is particularly important during a loading operation, in order that the hydraulic cylinders 18, 20 can extend more or less uniformly and simultaneously. It is also of interest that pressure adjustment operations can be performed smoothly. This in turn leads to improved ride comfort and driving safety.

The control valve device 24' represented in FIG. 6 can be used for a suspension system 22 in the same way as the control valve device 24 in all exemplary embodiments previously described. The control valve device 24' represented in FIG. 6 essentially differs from the preceding exemplary embodiment in that instead of ON/OFF-switch valves, the first and second admission control valves 128 and 144 are embodied as first and second proportional admission control valves 160 and 162, these proportional admission control valves 160, 162 being electromagnetically switchable between a position open in the direction of the hydraulic pump 126 and closed to the hydraulic tank 100 and a position closed in the direction of the hydraulic pump 126 and open to the hydraulic tank 100. The first and second discharge control valves 132, 144 in the discharge lines 136, 148 have furthermore each been supplemented by a further first and second proportional discharge control valve 164 and 166, which can both be switched between a bilaterally closed position and a bilateral opening position. Leak-tight discharge control valves 132, 144 are likewise advantageous in the discharge lines 136, 148, since conventional proportional valves are not leak-tight. It is obviously feasible here, as in the preceding figures, to replace leak-tight switch valves with resettable non-return valves, which are controlled by suitable means. It is only important that the connection can be closed and if necessary opened without any leakage. Where proportional discharge control valves 164, 166 are used, the restrictors and orifices 134, 146 provided in FIG. 5 are omitted.

In the event of a pressure increase in the suspension system 22 and in the loading operation state, the hydraulic fluid admission can be varied, as necessary, by means of the first and second proportional admission control valves 164, 166. The discharge-side valves 132, 144, 164, 166 are in the closed position. It is therefore not necessarily the hydraulic fluid flow that is adjustable but rather the rate of travel of the hydraulic cylinders 18, 20. As in the exemplary embodiments in FIG. 5, the greatest load pressure needed is signaled to the adjustable hydraulic oil pump 126 by means of the load-sensing device 156 in conjunction with the shuttle valve 158.

In order to reduce the pressure in the suspension system 22, the leak-tight discharge control valve 132, 144 is first opened followed by the proportional discharge control valve 164, 166, so that the outflow of hydraulic fluid to the hydraulic tank 100 can be controlled. In order to reduce the pressure, the proportional admission control valve 160, 162 is run into its position in which it is closed in the direction of the hydraulic pump 126 and open to the hydraulic tank 100, both control chains 122, 124 being similarly controllable, but independently of one another. Here too, the rate of travel of the respective hydraulic cylinders 18, 20 again serves as a measure for the adjustment of the proportional discharge control valve 164, 166. Whether the proportional discharge control valve 164, 166 is situated upstream or downstream of the discharge control valve 132, 144 is basically of no importance, since it has no effect on the function.

As already mentioned, an independent control of both control chains 122, 124 is possible both with the control valve device 24 described with reference to FIG. 5 and with the control valve device 24' described with reference to FIG. 6, so that it is possible to obtain a pressure increase in one control chain 122 and at the same time a pressure reduction in the other control chain 124, and vice-versa. It is furthermore also possible to obtain a simultaneous pressure increase or a simultaneous pressure reduction in both control chains 122, 124. Corresponding control sequences are filed in the electronic control unit 120 and can be selected by means of corresponding levers or switches (not shown) for activation and/or control of the suspension system 22.

The working of the suspension system 22 will be described below with reference to FIG. 5, a repeated representation and description of the load case sensing being dispensed with, since this has already been covered and described in detail above. It should again be pointed out that both the control valve device 24 according to FIG. 5 and the control valve device 24' according to FIG. 6 can be used and applied. It is further assumed that the load case is accordingly detected as safe and that the suspension can therefore be activated.

FIG. 5 shows the suspension system 22 in the initial state, with the frame 12 resting more or less evenly on both hydraulic cylinders 18, 20 and a certain constrained pressure in both hydraulic cylinders 18, 20. With the suspension system 22 in this state, all switch valves 42, 44, 50, 52 are closed, the admission control valves 128, 160 and 140, 162 are in the position in which they are closed in the direction of the hydraulic pump 126 and open to the hydraulic tank 100, the discharge control valves 132, 164 and 144, 166 are in their closed position, both of the hydraulic accumulators 54, 60 are discharged and the load state is rated as non-critical by the load state detection means (not shown in FIG. 5).

On activation of the suspension system 22, an accumulator charging state ensues. The accumulator charging state and the activation of the suspension are triggered by the machine operator or by the electronic control unit 120 as a function of the speed, or in some other way, provided that a non-critical load state has been assumed and is present. For this purpose both of the switch valves 42, 44 arranged in the piston rod-side connecting line 34, 38 are brought into the flow position, so that the piston rod-side chambers 30, 32 are connected to the piston-side chambers 26, 28. Although this causes the pressure in the hydraulic cylinders 18, 20 to rise, since the forces emanating from the frame 12 are supported on a smaller area, no movement of the piston occurs, since in this state there is only one degree of freedom. The frame therefore remains in its position. As the switch valves 42, 44 arranged in the piston rod-side connecting lines 34, 38 open, hydraulic fluid is simultaneously delivered to the two hydraulic cylinders 18, 20, in that the two admission control valves 128, 140 and 160, 162 switch to their control position in which they are open in the direction of the hydraulic pump 126 and closed to the hydraulic tank 100, first forming a connection between the pump line 160 and the suspension system 22. The hydraulic oil now flows via the pump line 160, the admission control valves 128, 140 and 160, 162, the admission lines 130, 142, the non-return valves 152, 154, the supply lines 46, 48 and the connecting lines 56, 62 into the hydraulic accumulators 54, 60. At the same time a connection is established to the load-sensing device 146, so that the highest consumer pressure to the hydraulic pump 126, which is preferably embodied as an adjustable pump system, can be signaled via the shuttle valve 158. The non-return valves 152, 154 are necessary in order to keep the leakage rate low and to afford a facility for the requisite load-sensing-signal detection between the admission control valve 128, 140 and 160, 162 and the consumer or hydraulic cylinder 18, 20. It is important that no load-sensing signal be generated if the admission control valve 128, 140 and 160, 162 is in the position in which it is closed in the direction of the hydraulic pump 126. If the hydraulic accumulators 54, 60 are discharged on commencement of the accumulator charging sequence and the activation of the suspension system, the hydraulic fluid first flows into the hydraulic accumulators 54, 60 and charges these up. Once the pressure in the respective hydraulic accumulator 54, 60 has increased to a point where it is equal to that in the hydraulic cylinder 18, 20, the piston rod of the hydraulic cylinder 18, 20 is extended, which can be detected by the position monitoring of the frame via the position sensors 115, 116. Similarly, the pressures in the piston rod-side chambers 30, 32 also rise to the same value as in the piston-side chambers 26, 28, so that the hydraulic fluid flows via the non-return valves of the switch valves 50, 52 arranged in the supply lines 46, 48 into the piston-side chambers 26, 28 of the hydraulic cylinders 18, 20 and causes these to extend. Once the extending of the hydraulic cylinder 18, 20 has been detected by the electronic control unit 120, the admission of fresh hydraulic fluid is shut off, in that the two admission control valves 128, 140 and 160, 162 switch to their control position, in which they are closed in the direction of the hydraulic pump 126 and open to the hydraulic tank 100, interrupting a connection between the pump line 160 and the suspension system 22. At the same time, the switch valves 50, 52 arranged in the supply line 46, 48, which connect the respective hydraulic cylinder 18, 20 to the corresponding hydraulic accumulator 54, 60, are opened. The system is therefore in its suspension state.

The non-return valves of the switch valves 50, 52 arranged in the supply lines 46, 48 can naturally be designed in some other way by using a double-sided, leak-tight switch valve, for example, and fitting this in a bypass line (not shown). It is important that a leak-tight connection be established, which only allows hydraulic fluid to pass in one direction and which can be opened bilaterally when necessary.

With uneven loading of the vehicle 10, it can happen that one hydraulic cylinder 18, is extended first, so that the admission control valves 128, 140 and 160, 162 also have to be switched off individually, which does not impair the basic functioning of the suspension system 22, however. It is important that the hydraulic cylinders 18, are extended somewhat before all the switch valves 42, 44, 50, 52 are opened, since only in this way can it be ensured that the frame 12 will not subside or jump up. In order to make the process of loading and extending the hydraulic cylinders 18, 20 more manageable, it is feasible to use flow control valves (not shown), which keep the inlet volumetric flow of hydraulic fluid constant. Once all the switch valves 42, 44, 50, 52 on the hydraulic cylinders 18, 20 are opened, the vehicle 12 is in the suspension state, since both hydraulic cylinders 18, 20 can move.

The hydraulic roll stabilization now functions so that, when the first hydraulic cylinder 18 arranged on the front axle 14 retracts due to a roadway stimulus, for example, the impact is damped via the orifice 58 arranged on the hydraulic accumulator 54 and via the hydraulic accumulator 54 itself and is transmitted back to the front axle 14. When the energy is transmitted back to the front axle 14, there is the risk that the frame 12 moves out beyond its starting position and the second hydraulic cylinder 20 is retracted as a result, while the first hydraulic cylinder 18 is extended further. This can lead to an unstable oscillation of the frame 12 and therefore to an unstable vehicle state. In order to prevent this, the orifices 58 and 64 are correspondingly electronically controlled so that an unstable oscillation can be counteracted by virtue of the orifice cross section being varied. This varies or influences the damping rate of the entire system and counteracts a swinging motion of the frame 12.

To assist this, it would be possible at the same time to retract the second hydraulic cylinder 20 on account of a change in position of the first hydraulic cylinder 18 and of the signal generated by the position sensor 115 and the electronic control unit 120.

In this suspension state adjustments to varying load states are always possible. In order that this can happen, provision is made, as already mentioned above, for two position sensors 115, 116, which serve to determine and monitor the position of the front axle 14 relative to the frame 12. If the load increases due to the picking-up of a payload, the pressure in the piston-side chambers 26, 28 of the hydraulic cylinders 18, 20 can be increased according to the process described above.

Here the admission control valves 128, 140 and 160, 162 are switched in the same way as for the accumulator charging sequence. It can obviously also happen that only one side needs more pressure, which is why it is naturally also possible to use only one of the two admission control valves 128, 140 and 160, 162. If the load is reduced, on the other hand, due to the release of a payload, the pressure in the piston-side chambers 26, 28 of the hydraulic cylinders 18, 20 can be reduced. This is done by discharging hydraulic fluid from the suspension system, it being possible, here too, to discharge fluid on both sides or also on one side only. The discharging process is performed by switching the switch valves 42, 44, 50, 52 to the flow position, so that the hydraulic connections to the chambers 26, 28, 30, 32 are bilaterally opened, and by switching the discharge control valves 132, 144 and 164, 166 to their flow position, the admission control valves 128, 140 and 160, 162 being switched to the position in which they are closed in the direction of the hydraulic pump 126 and open to the hydraulic tank 100. The restrictors and orifices 134, 146 arranged in the control device 24 serve to ensure that the hydraulic fluid cannot flow off too rapidly, so that the process remains manageable. In the embodiment with the control device 24', the proportional discharge control valves 164, 166 arranged there assume this function. Instead of the restrictors or orifices 134, 146, it would also be feasible to use suitable small switch valves, or to arrange flow control valves upstream or downstream of the discharge control valve 132, 144.

Furthermore, in the suspension state an adjustment to an asymmetrical load state can also be performed if, for example, loads with an eccentric centre of gravity are being transported or the vehicle is moving along the side of an incline. For this purpose one control chain 122, 124 in the control valve device 24 and 24' is operated in the admission position and the other control chain 122, 124 in the discharge position, depending on the load state. For example, in the suspension state, i.e. when all switch valves 42, 44, 50, 52 are in the flow position, the first hydraulic cylinder 18 must be extended and the second hydraulic cylinder 20 retracted in order to correct the load state. In this case the first control chain 122 is operated in the admission position, i.e. the first admission control valve 128 and 160 is switched to its position in which it is open in the direction of the hydraulic pump 126 and closed to the hydraulic tank 100, the first discharge control valve 132 being in the closed position. At the same time the second control chain 124 is operated in the discharge position, i.e. the second admission control valve 140 and 162 is switched into its position in which it is closed in the direction of the hydraulic pump 126 and open to the hydraulic tank 100, the second discharge control valve 144 and 166 being in the flow position. In this state the load-sensing device 156 signals a pressure in the first control chain 122, which is relayed to the hydraulic pump 126, whereas the load-sensing device 156 is relieved in respect of the second control chain 124. The hydraulic fluid delivered via the first control chain 122 can flow into the piston-side chamber 26 of the first hydraulic cylinder 18, whereas the hydraulic fluid contained in the piston-side chamber 28 of the second hydraulic cylinders 20 can flow off into the hydraulic tank 100. Thus the first hydraulic cylinder 18 is raised and the second hydraulic cylinder 20 is retracted. In the reverse case, the second control chain 124 is correspondingly operated in the admission position and the first control chain 122 in the discharge position.

When the front axle 14 of the vehicle 10 is sprung and in normal working operation loads rest on this front axle 14, measures may be necessary in order to ensure a static stability and driving safety of the vehicle 10. It may be necessary, for example, for the hydraulic accumulator 54, 60 to be discharged each time following a deactivation of the suspension system (switching the switch valves 42, 44, 50, 52 to the closed position). The reason for this is the accumulator charging sequence, since this is preferably performed in such a way that the pressure in the hydraulic accumulators 54, 60 is less than in the respective piston-side chambers 26, 28. If the pressure in the hydraulic accumulators 54, 60 were higher, on opening of the switch valves 42, 44 arranged in the piston rod-side connecting lines 34, 38, the hydraulic cylinders 18, 20 would be extended uncontrollably, which constitutes a safety risk that is to be avoided. The pressure from the hydraulic accumulators 54, 60 should therefore always be discharged to a sufficiently low level. A sufficiently low level in this context does not mean that a complete draining would be advisable, since if it is designed as a diaphragm or bladder accumulator, this can again over time damage a hydraulic accumulator 18, 20. By means of pressure sensors (not shown) it is feasible here to purposely set a value designed to achieve a short charging time for the hydraulic accumulators 54, 60.

In the case of a loader vehicle having an extendable arm, such as a telescopic loader, for example, the load rests on the vehicle 10 primarily via the sprung front axle 14. It may therefore be advisable for the suspension system 22 to be switched off above a certain arm height, since with an increasing lever arm the load could build up and cause the vehicle 10 to overturn if the suspension system 22 were activated. In order to prevent this, a position sensor, angle sensor, contact switch or other suitable appliance (not shown), which sends a useable control signal (activation/deactivation signal) to the electronic control unit 120 intended to control the suspension systems 22, may be installed in order to determine the lifting height or extended length of the arm. Where necessary, the mass of the payload can also be taken into account when activating/deactivating the suspension system 22.

As already described, the position of the front axle 14 relative to the frame 12 is an important measurement. It may therefore be advisable, before activation of the suspension system 22, to move the front axle 14 into a pre-defined position relative to the frame 12, in order, for example, to provide sufficient suspension travel (travel for the hydraulic cylinders 18, 20). This can be done by control valves (not shown), which with the suspension deactivated (closed switch valves 42, 44, 50, 52) serve to adjust the hydraulic cylinders 18, 20 by way of the resettable non-return valves 82, 84, 86, 88. The position of the front axle 14 relative to the frame 12 is also important in order to be able to detect changes due to load reversal. Thus a variation or lateral shifting of the payload is registered as a static retraction or extension of the hydraulic cylinder(s) 18, 20 and can be compensated for by deliberately boosting or relieving the pressure and thereby adjusting the hydraulic cylinder strokes, so that the front axle 14 is always situated in an optimum position relative to the frame 12. Various methods are feasible for determining the position of the front axle 14 relative to the frame 12. For example, it is also possible to use the position sensors 115, 116 and angle sensors already being used, or other travel sensors (not shown), in order to arrive at the required measurements. Registering the position of the front axle 14 relative to the frame 12 furthermore permits an adjustment of the front axle 14 with the suspension system 22 deactivated. Such an adjustment is advisable in order to increase the stability of the vehicle 10 on an incline, since the lateral inclination of the frame 12 can be reduced, making it possible to move greater loads than normal to greater heights. It is also advisable to use the measured and registered relative position as a value for assessing the load states of the vehicle 10. For example, abrupt over-rapid movements can be identified as a fractured pipe and can serve as an additional safety feature. Thus a lateral overloading and an excessive inclination of the vehicle 10 can further be identified and the suspension system can then be switched off for safety reasons and the frame 12 run back into a safer position.

As already described above, the frame 12 must be raised on activation of the suspension system. To do this, and for adjustments to modified load states, the required hydraulic fluid must be supplied. This is basically done by a pump, which also supplies the other hydraulic functions of the vehicle 10 with hydraulic fluid. If the suspension system 22 is activated whilst underway, the sudden power draw on the hydraulics motor can have a disturbing effect on the drive system of the vehicle 10. It may therefore be advisable, by means of an accumulator charging valve (not shown), to provide and preload a suitably large hydraulic accumulator (not shown), which then supplies the requisite hydraulic fluid for the suspension system 22. In such a case the load-sensing device 156 could be dispensed with, since sufficient hydraulic fluid would be constantly available.

On wheeled loaders it is usual for their arm suspension to be switched on or off as a function of the speed of the vehicle, the suspension being switched off (deactivated) on reaching a certain speed limit. This is advisable, since when underway no precise movements have to be performed. Implementation on a telescopic loader is somewhat different, since here a distinction has to be made between pure transporting overland with a trailer, transporting in order to move a load a few meters from A to B, and pure loading operations. It is therefore advisable to incorporate three different axle suspension modes:

Pure loading, lifting and digging work: The suspension system 22 is deactivated and the hydraulic cylinders 18, 20 are fixed.

Short journeys transporting a load from A to B: The suspension system automatically shuts off below a specific speed of travel and switches back on automatically above a specific speed of travel.

Long transporting journeys overland with a trailer: The suspension system 22 is constantly activated and only shuts off if the system detects a critical load state.

The constant activation of the suspension system may be advisable for longer transporting journeys, since at traffic lights, cross-roads and junctions, for example, no power is being drawn from the engine for activation of the suspension system 22, whilst the entire power output can be used for acceleration of the vehicle 10 and for drawing the trailer.

In order to further suppress rolling movements and to increase the stability of the vehicle 10, it is feasible to fix the actually floating rear axle 16 of the vehicle 10. It might be advantageous here for the design of the front axle 14 to be substantially simplified in certain aspects. For example, roll stabilization could be dispensed with. A disadvantage here, however, would be that in this event load cases and hence stresses and deformations would act on the frame 12, which would constitute a considerable and above all an unusual loading. A considerable reinforcement and hence redesigning of the frame 12 would be necessary. Even damping the oscillating movements of the rear axle 16 would also produce this effect. Although the load stresses would not be as great as with an immobile fixing, reinforcements to the existing frame construction would also be necessary here.

Hydraulic accumulators 54, 60 must be safeguarded against overpressures in accordance with a directive on pressure vessels, which is why the exemplary embodiments represented with reference to FIGS. 1 to 6 comprise a pressure relief valve (not shown) on the hydraulic accumulators 54, 60. Since this, like a pressure release valve for releasing the pressure prior to servicing work, is not important for the functional working, it has not been included in the figures.

In each of FIGS. 2 to 5 a hydraulic accumulator 54, 60 has been drawn in on each hydraulic cylinder 18, 20. It is readily feasible, however, to provide more than one hydraulic accumulator 54, 60, which may be provided with different preloading pressures, in order to exploit the advantages of a 'variable springing rate' for the suspension system 22.

Even though the invention has only been described with reference to just a few exemplary embodiments, many different alternatives, modifications and variants, which come within the scope of the present invention, will suggest themselves to the person skilled in the art in the light of the description above and the drawing.

Having described the preferred embodiment, it will become apparent that various modifications can be made without departing from the scope of the invention as defined in the accompanying claims.

The invention claimed is:

1. A suspension system for an agricultural or construction industry vehicle, having a first and a second hydraulic cylinder, which support a frame of the vehicle in relation to an axle of the vehicle, the hydraulic cylinders each having a piston-side chamber and a piston rod-side chamber and each of the chambers of the hydraulic cylinders being hydraulically connectable to one another via a piston rod-side connecting line and a piston-side connecting line, the piston rod-side connecting lines each opening into the piston-side connecting lines and being provided with a switch valve, a first supply line connected via a switch valve to the piston-side connecting line of the first hydraulic cylinder, a second supply line connected via a switch valve to the piston-side connecting line of the second hydraulic cylinder, a first and a second hydraulic accumulator connected to the first and second supply line respectively, a hydraulic pump, a hydraulic tank, a control valve device, the control valve device being connected via the respective supply lines to the respective connecting lines, and an electronic control unit, wherein the hydraulic accumulators are connected via adjustable orifices and means for a detection and compensation of load states of the vehicle are provided in the suspension system.

2. A suspension system according to claim 1, wherein the means for the detection and compensation of load states comprises pressure transducers and means for registering a position of a pressure transducer, the pressure transducers in each case being arranged between the piston-side and piston rod-side chambers of each of the hydraulic cylinders.

3. A suspension system according to claim 2, wherein an area ratio of the pressure-generating areas in the chambers of the pressure transducer essentially corresponds to an area ratio of the pressure-generating areas in the chambers of the hydraulic cylinder.

4. A suspension system according to claim 2, wherein the means for registering the position of a pressure transducer comprises one of a switch and sensor.

5. A suspension system according to claim 1, wherein the means for the detection and compensation of load states comprises pressure sensors, which serve to register a pressure in the individual chambers of the first and second hydraulic cylinders.

6. A suspension system according to claim 1, wherein the means for the detection and compensation of load states comprises pressure switches, which are in each case connected to one of the chambers of the hydraulic cylinders.

7. A suspension system according to claim 1, wherein the means for the detection and compensation of load states comprises force sensors, which serve to detect forces acting on the hydraulic cylinders.

8. A suspension system according to claim 1, wherein the switch valves have a flow position and a closed position, the closed position of the switch valves arranged in the supply lines comprising a non-return valve opening in the direction of the respective hydraulic cylinders.

9. A suspension system according to claim 1, wherein the supply lines are provided with pressure switches.

10. A suspension system according to claim 1, wherein the control valve device comprises a first admission line opening into one of the first and second supply line and a second admission line opening into the other one of the first and second supply line, and a first discharge line opening into one of the first and second supply line and a second discharge line opening into the other one of the first and second supply line, the admission lines being connectable via admission control valves to one of the hydraulic pump or the hydraulic tank and the discharge lines being connectable via discharge control valves to the hydraulic tank.

11. A suspension system according to claim 10, wherein at least one of the admission control valves and the discharge control valves comprise switch valves.

12. A suspension system according to claim 10, wherein at least one of the admission control valves and the discharge control valves comprise proportional valves.

13. A suspension system according to claim 10, wherein a load-sensing device is provided, which registers a pressure in at least one of the first and second admission line.

14. A suspension system according to claim 10, wherein the admission lines are provided with a non-return valve opening in the direction of the supply lines.

15. A suspension system according to claim 10, wherein the discharge lines are provided with one of a restrictor and orifice.

16. A suspension system according to claim 1, wherein the piston-side and the piston rod-side chambers of the hydraulic cylinders are each provided with a resettable non-return valve, the non-return valve opening in the direction of the respective chamber.

* * * * *